April 9, 1968 E. FRANK 3,377,430

HIGH-FREQUENCY STEREO DECODER CONTAINING ELECTRONIC MONO-STEREO SWITCHING MEANS

Filed Aug. 12, 1964 2 Sheets-Sheet 1

Inventor:

Egon Frank

Inventor:
Egon Frank

United States Patent Office 3,377,430

Patented Apr. 9, 1968

3,377,430

HIGH-FREQUENCY STEREO DECODER CONTAINING ELECTRONIC MONO-STEREO SWITCHING MEANS

Egon Frank, Ringstrasse 4a, Berlin, Germany

Filed Aug. 12, 1964, Ser. No. 393,489
Claims priority, application Germany, Aug. 17, 1963, L 45,632
4 Claims. (Cl. 179—15)

Figure 1:
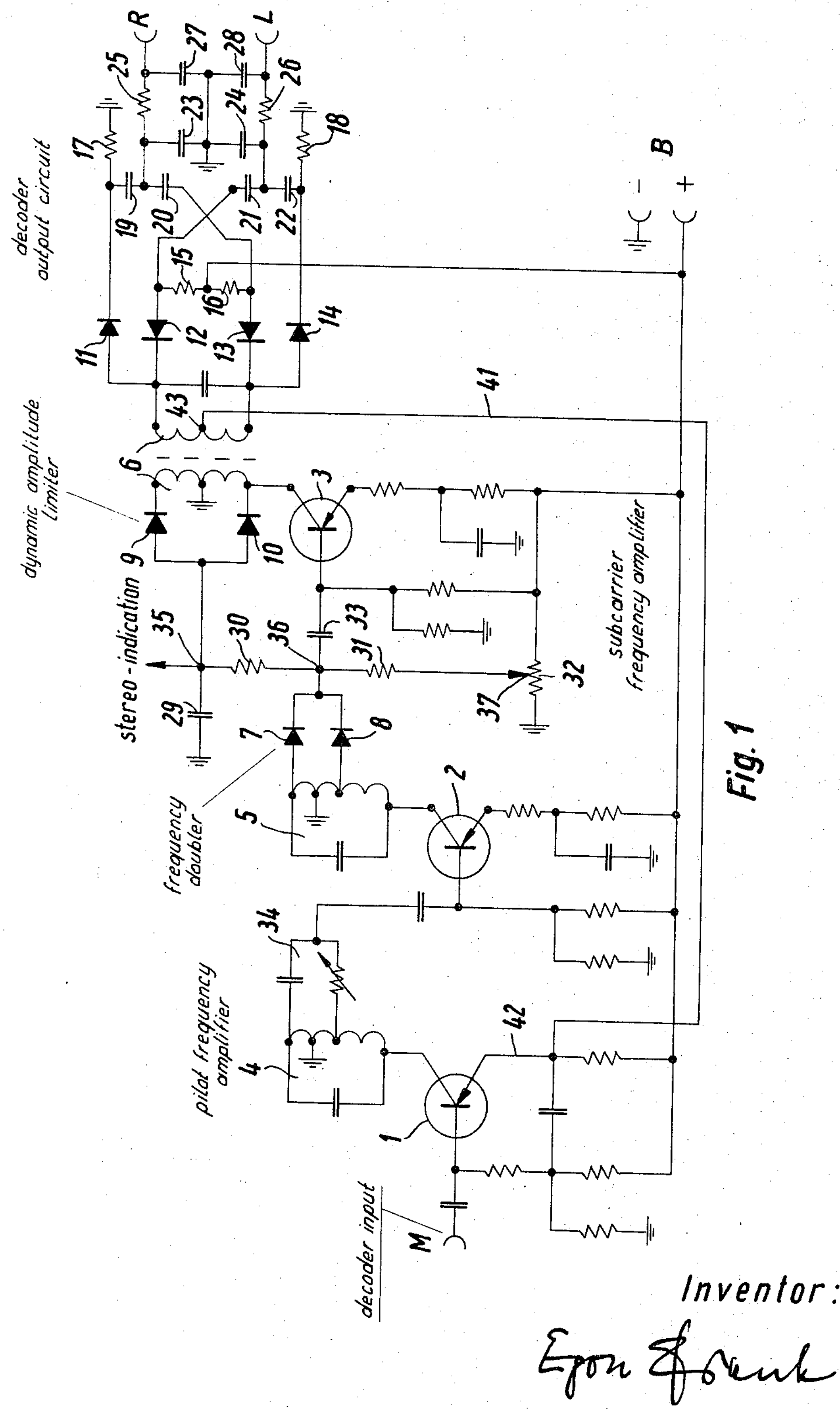

Radio sets which for the reception, e.g., of the American "pilot tone process" for the broadcasting of stereo programs are provided with two low frequency channels and a so-called "stereo-decoder" for separating the multiplex signal have appropriately a changeover switch for the functions "mono" and "stereo." This changeover switch enables mono programs to be received without the intervention of the decoder, thus reducing the receiver's susceptibility to electric interference.

In stereo programs also, which require very low field strength, it is possible by changing over to "mono" to reduce considerably the disturbing noises, which because of the inadequate working of the limiters of the frequency modulation receiver at low antenna voltages can amount to approximately 20 decibels.

Beside the hand operated mono-stereo changeover switch mentioned automatic changeover switches are also known in which the changeover is made over a relay when the pilot signal received has reached such a level that after appropriately selective amplification and subsequent rectification it causes the relay to become operative. Such arrangements, however, are disadvantageous because they are too expensive.

Further electronic changeover devices without relay are also known in which, e.g., the switching on of the pilot signal is controlled inside the decoder by the rectified voltage of the ratio detector. The disadvantage here is that the changeover does not occur suddenly at a definite antenna voltage, but a transition region lying between two limit values of the control voltage exists within which region the receiver is switched neither definitely to "mono" nor to "stereo" and tends to distort the signal received.

Further arrangements are known in which the pilot signal received is rectified and becomes operative through displacing the bias potential of an operating stage within the decoder and at the same time synchronises an oscillator for the pilot frequency or its second harmonic, the regenerated subcarrier frequency, which is required for the decoding process.

This arrangement can however also be excited by disturbing noises, e.g., during the tuning process, arising between the carrier frequencies of the transmitters to intermittent functioning, which produces very unpleasant noises. Apart from this such arrangements incline to phase displacements of the subcarrier or pilot signal and consequently to increased cross-talk in the two low frequency channels if the oscillator release voltage is not stabilized to a definite value of the operating potential.

Finally an electronic switching means is known intended for decoders of the so-called "matrix type," in which the "compatible" summation factor of the multiplex signal is composed together with the demodulated difference factor of the actual stereo component, most commonly in a "matrix network" consisting of resistances, to form the resulting R- and/or L-output signal.

In this device the difference signal is cut out by a diode switch mostly controlled over an amplifier by the pilot signal, namely when the pilot amplitude is below the response value.

This arrangement has the following disadvantages:

The decoder of this type of circuit needs expensive filters for separating the difference signal and has in the matrix network such heavy attenuation that it often requires additional amplification of the multiplex signal or of the two low frequency output signals to restore the output level to the input value.

Apart from this the diode switch requires an additional D.C. amplifier. Finally the switchover from "mono" to "stereo" in this arrangement too is not performed suddenly but continuously in a transition interval of the input level, unless a "flip-flop" control causing further enhanced expense is used.

The device in accordance with the invention for automatic electronic switchover of the decoder from "mono" to "stereo" avoids all the disadvantages described of the known arrangements and requires only very slight additional expense in the circuit.

The circuit arrangement for the stereo decoder, which for automatic electronic switchover of its operation to mono or stereo reception uses a selective inverse potenial at the frequency doubler diodes as a means for performing the switchover process, is in accordance with the invention characterized in that with a pilot tone amplitude which exceeds the inverse potential a counter potential is gained through rectification at a subsequent amplifier stage, which counter potential cancels the inverse potential through a potential divider, thus releasing in the subsequent amplifier an immediate full build-up of the carrier potential required for the decoding.

Figure 2:
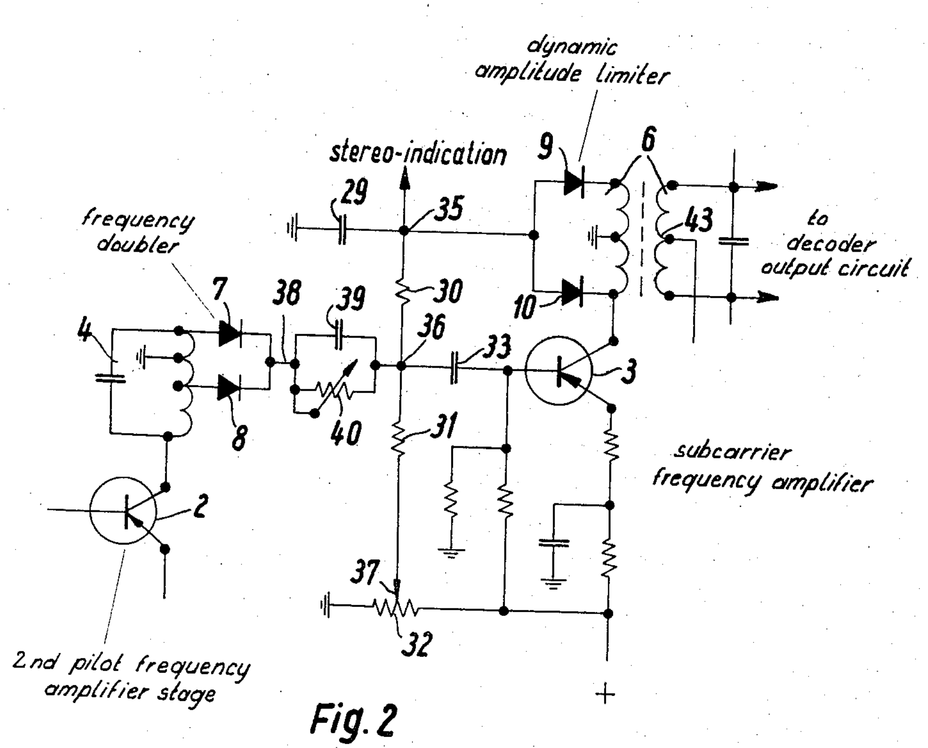

The function of the device in accordance with the invention is explained in detail with reference to the illustrations, in which FIG. 1 shows an exemplary embodiment of the decoder circuit in accordance with the invention, and FIG. 2 shows a further development of this exemplary design.

All parts in the circuit serving for current supply, stabilization of the operating point or reverse feed-back need no further explanation because they are conventionally disposed.

Referring to FIG. 1 the multiplex signal is led from the frequency modulation detector of the receiver—before the de-emphasis complex—to the input M of the decoder and arrives at the base contact of the transistor 1. This operates as an impedance transformer for the multiplex signal, which is available in the low ohmic circuit of its emitter 42.

At the collector side of the transistor 1 lies the oscillating circuit 4 tuned to the pilot frequency of, e.g., 19 kc./s., the potential of which circuit is simultaneously stepped down and connected via the phase shifter 34 with the base of transistor 2, controlling this. The collector circuit 5 of this transistor acting over two diodes 7 and 8 connected in push-pull doubles the frequency of 38 kc./s. The doubled pilot frequency at point 26, at present consisting of positive semi-waves, is led over condenser 33 to the base of transistor 3, in whose collector circuit lies a transformer 6 with its secondary winding tuned, e.g., to 38 kc./s. resonance, which transformer filters from the semi-waves the purely sinusoid 38 kc./s. frequency.

To the centre 43 of the secondary winding the multipelx signal is fed from the emitter 42 of transistor 11 and—in the presence of a subcarrier regenerated from the pilot signal—is decoded over the push-pull diode switch in accordance with the form of the envelope curve of the multiplex signal.

Hereby there arises at output R over the diodes 11 and 12, the separate condensers 19 and 20, the storage condenser 23 and the de-emphasis circuit of resistor 25 and condenser 27 the right low frequency signal of the stereo program, at output L over diodes 12 and 14 and the corresponding components 21, 22, 24, 26, 28, the left LF signal of the stereo program. The high-impedance resistors 15, 16, 17 and 18 also present in this portion of the circuit lead over each of the two diode pairs 11–13 and 12–14, even in the absence of an subcarrier during a mono program, a sufficiently great initial current so that the always sufficiently conductive diodes propagate a monosignal received over the lead 41 undistorted to the, in this case, equal outputs R and L.

Inversely this initial current does not adversely affect the peak voltage switching function of the diodes (11 to 14) for the modulated subcarrier when working on stereo, as the condensers 19 and 20 and/or 21 and 22 are always charged nearly to the peak voltage of the subcarrier.

Now after having explained the functioning principles of the decoder in "mono" and "stereo" operation the functioning of the automatic change-over between these two operating conditions will be described.

By means of the variable slider 37 of the voltage regulator 32, whose end contacts lie at the two poles of the supply battery B, a definite potential positive relative to ground is set. This is reduced by further voltage divider resistors 31 and 30, which are connected to ground over the diodes 9 and 10, to such a value that in point 36 the cathodes of the diodes 7 and 8 of the full-wave rectifying circuit are so far positively biased that they completely block from the base of the subsequent transistor 3 small pilot voltages and the noise voltage which mostly occurs additionally here. Here the decoder is working, as described, on "mono."

At a definite magnitude of the received pilot voltage, which within certain limits is freely selective through the D.C. potential at 37—insofar as stereo programs are concerned—the peaks of the positive pilot voltage semiwaves exceed the positive bias in point 36, i.e., the frequency-doubler diodes 7 and 8 are now conductive. Over condenser 33 small voltage surges first reach the base of the transistor 3, in whose collector circuit they are amplified and rectified over diodes 9 and 10, 29 acting as a charging condenser of this full-wave rectifying arrangement.

The negative potential now arising at point 35 at first causes over the voltage-divider resistors 30 and 31 at point 36 a reduction of the positive inverse voltage of the doubler diodes 7 and 8. This enlarges the voltage surges reaching the base of transistor 3, and also the negative potential of point 35, and thus the positive potential in point 36 is further reduced, until finally point 36 drops to about ground potential. A further drop is impossible because of the diodes 7 and 8.

Just as therefore the rectified pilot voltage coming from diodes 7 and 8 even only slightly exceeds the inverse potential of point 36, a tilting process is impulsively initiated which suddenly builds up at the resonance transformer 6 the full carrier voltage and thus throws over the decoder from "mono" to "stereo" operation. This ensures the avoidance of an interim stage with insufficient carrier amplitude. From point 35 a control line can be also appropriately branched off for a stereo indication (St.–A.) which through, the negative voltages may release, e.g., a light signal.

The two diodes 9 and 10 have apart from the described control action together with condenser 29 and the resistance 30 which simultaneously acts as a charge eliminator the additional function of a dynamic, two-phase amplitude limiter of the carrier voltage (full-wave rectifier system) which cuts off noise and disturbing voltages and thus keeps these undesirable components, insofar as they are derived from the subcarrier, ineffective in the decoding process.

Stereo working is switched on as described when the pilot amplitude is sufficient to exceed the potential set with the potentiometer and lying at point 36 as proportional partial value.

To avoid instabilities and flutter switching off must not be done until the pilot amplitude is low enough.

Quantitatively the following context applies for the critical values of the pilot amplitude in the potential point 36:

Pilot amplitude in point 36 for switching on: $U_{PE36}$
Pilot amplitude in point 36 for switching off: $U_{PA36}$
D.C. voltage in point 36: $U_{36}$
D.C. voltage in point 37: $U_{37}$ Amplification factor of transistor 3

$$\frac{U\sim\text{Collector}}{U\sim\text{base}}=V_3 \qquad (1)$$

Relative ratio of resistors R30/R31=$n$ (2)

$$U_{PE36}=U_{37}\cdot\frac{n}{n+1} \qquad (3)$$

$$U_{PA36}=U_{37}\cdot\frac{n}{n+1+V_3} \qquad (4)$$

In order to obtain a reliable tilting effect even at low level of pilot voltage, the arguments in the above equations must be $n<$approx. 0.5 and $V_3>$approx. 5.

If for practical purposes favourable values are chosen, e.g. $n=0.25$ and $V_3=10$, a ratio of the switching-on level to the break level at point 36 of $$\frac{U_{PE36}}{U_{PA36}}=\frac{n+1+V_3}{n+1}=9$$

is given. It has already been pointed out above that the switching-on level and the break level must differ sufficiently to avoid instabilities and flutter in the critical level zone around the make value.

If, however, as calculated in the above example, the switching on and break-level ratio is of approximately one order of magnitude or more, difficulties in the reliability of the break function may arise through disturbing noise voltages heterodyning with the working signal, e.g., random noise between the carrier waves during tuning.

Considering all factors a switching on and break-level ratio favourable for practical use is given around the value $$\frac{U_{PE36}}{U_{PA36}}\approx 2$$

To realize such a value or a similar value a potential shift favouring the circuit-breaking must be effected subsequently to switching-on, i.e., by using a suitable device which after the switching-on at first reduces the initial current flowing over point 36 through the diodes 7 and 8 and at the same time prepares an earlier transition of the diode cathodes to a positive inverse potential, which transition can begin immediately after the potential reduction has started in point 35.

An exemplary solution of this problem, supplementary to the circuit diagram in FIG. 1, is given in FIG. 2. An additional feature here is an, e.g., variable resistor 40 between the doubler diodes 7 and 8 and point 36, which resistor is bridged with a condenser so as to transmit unattenuated the pilot semi-waves to the base of transistor 3. At the same time this condenser 39 with the resistor 40 forms a time constant whose value is approximately one order of magnitude greater than the product of the capacity of condenser 29 and the mains equivalent of all leak resistors 30, 31, 32 and 40.

Because of the magnitude of the time constant of condenser C39 multiplied by the value of resistor R40 and of the first static control of point 38 the additional controls have practically no influence on the switching on conditions under Equation 3.

After switching on, condenser 39 is charged up to a value corresponding to the voltage divider ratio of resistor 40 to the source impedance of point 36, having regard to the potentials in points 35 and 37 and to point 38, which because of the diodes 7 and 8 being in forward polarity is at ground potential.

In this circuit modification, because of the time constant of the parts 39 and 40 the unambiguous value under Equation 4 no longer applies for the break level, because the breaking depends inter alia substantially on the voltage stored on condenser 39 and the rate of change of this potential, e.g., in tuning. Under the dimensional conditions explicated as appropriate $$R_{31} \geqq 5 \cdot R_{30}$$

approximately the appropriate ratio $$\frac{U_{PB36}}{U_{PA36}} \approx 2$$

is obtained when $R40 \approx R30$ is selected, $U_{PB}$ being the operating value of the pilot level obtaining in point 36 and there being a sufficiently high potential-change rate, limited only by the time constant of point 35.

This means therefore that the break is made, e.g., in mistuning during retuning of the receiver, where the pilot amplitude has dropped to about half.

Very slow reduction of the pilot voltage in this circuit too releases the breaking function at the level defined by Equation 4.

I claim:

1. FM multiplex stereo decoder system for receiving high-frequency transmissions modulated with audio signals together with a pilot tone frequency comprising an input amplifier for amplifying the multiplex signal, a subsequent second selective amplifier for amplifying said pilot frequency, a full-wave rectifier system in the selective output circuit of said second amplifier for doubling the pilot frequency, a subsequent variable voltage divider, a further subsequent third selective amplifier for amplifying said doubled pilot frequency, a resonance transformer and a full-wave rectifier circuit in the output of said latter amplifier, said full-wave rectifier system in said second amplifier consisting of two diode systems connected together in push-pull with the selective output circuit of said second amplifier, the anodes of said diode systems being together connected to said variable potential divider as well as to said third amplifier, said voltage divider consisting of a plurality of resistors connected as to be adapted to supply D.C. threshold value for interrupting said full-wave rectifier system in the output of said second amplifier in case of absence of said pilot frequency, the primary of said resonance transformer of said third selective amplifier being connected together with two diodes as to form said full-wave rectifier circuit in the output of said third amplifier, the poles of said latter diodes not connected with said primary being in direct conductive connection with said variable voltage divider, said latter diodes being thus adapted to act as dynamic noise limiter by supplying via said voltage divider said two diode systems of said second amplifier with a D.C. threshold bias voltage dependent on the pilot signal voltage in the output of said third amplifier, the secondary of said resonance transformer being connected with a balanced diode switching system for demodulating the two stereo components of said multiplex system, said latter secondary having further a center tap connected with the output circuit of said input amplifier conducting the amplified multiplex signal to said diode switching system for demodulating the two stereo components.

2. FM multiplex stereo decoder system as claimed in claim 1, wherein all amplifiers are transistor components.

3. FM multiplex stereo decoder system as claimed in claim 1, wherein said potential divider contains at least one adjustable resistor, thus being adapted to enable the use of a variable D.C. threshold bias potential for cutting off the circuit connection of said full-wave rectifier system in the output circuit of said second amplifier.

4. FM multiplex stereo decoder system as claimed in claim 1, wherein a phase shifter circuit is inserted between said first and second amplifier as well as between said second amplifier and said subsequent potential divider.

References Cited

UNITED STATES PATENTS

| | | | |
|---|---|---|---|
| 3,210,474 | 10/1965 | Santilli et al. | 179—15 |
| 3,242,264 | 3/1966 | De Vries | 179—15 |
| 3,264,414 | 8/1966 | De Mong | 179—15 |

JOHN W. CALDWELL, *Acting Primary Examiner.*

ROBERT L. GRIFFIN, DAVID G. REDINBAUGH, *Examiners.*